(12) United States Patent
Lu

(10) Patent No.: US 7,783,877 B2
(45) Date of Patent: Aug. 24, 2010

(54) BOOT-SWITCHING APPARATUS AND METHOD FOR MULTIPROCESSOR AND MULTI-MEMORY SYSTEM

(75) Inventor: Ying-Chih Lu, Taipei (TW)

(73) Assignee: Inventec Corporation, Taipei (TW)

( * ) Notice: Subject to any disclaimer, the term of this patent is extended or adjusted under 35 U.S.C. 154(b) by 770 days.

(21) Appl. No.: 11/748,500

(22) Filed: May 15, 2007

(65) Prior Publication Data

US 2008/0288764 A1    Nov. 20, 2008

(51) Int. Cl.
G06F 1/24       (2006.01)
G06F 11/00      (2006.01)
G06F 15/177     (2006.01)

(52) U.S. Cl. .............................. 713/2; 713/1; 713/100; 714/1; 714/5; 714/10

(58) Field of Classification Search ............ 713/1, 713/2, 100; 714/1, 5, 10
See application file for complete search history.

(56) References Cited

U.S. PATENT DOCUMENTS 6,061,788 A * 5/2000 Reynaud et al. ............. 713/2
2006/0218432 A1 * 9/2006 Traskov et al. ............... 714/5
2008/0235454 A1 * 9/2008 Duron et al. ............... 711/128

* cited by examiner

Primary Examiner—Thomas Lee
Assistant Examiner—Michael J Brown
(74) Attorney, Agent, or Firm—Jianq Chyun IP Office

(57) ABSTRACT

A boot-switching apparatus suitable for a system having a plurality of processors and a plurality of memories and a method thereof are provided. While booting the system, a single timer is used for counting down a time-out and it is determined whether a disabling signal sent by a Basic Input/Output System (BIOS) is received during the countdown. If the disabling signal is not received and the time-out is up, whether the processors operate normally is further detected and a plurality of detection signals is obtained. Next, whether each of the detection signals matches its corresponding enabling signal is determined. If the two do not match, the corresponding processor is disabled. If all of them match, the memories are switched. Accordingly, the problem of misjudgment in the prior art can be resolved and the system can be led to select normal processor and memory for executing its booting.

27 Claims, 8 Drawing Sheets

ROM TIME-OUT>FRB TIME-OUT

| CPU0 | CPU1 | ROM0 | ROM1 | RESULTS FROM THE PRIOR ART (CPU0/CPU1,ROM) | RESULTS FROM THE PRESENT INVENTION |
|---|---|---|---|---|---|
| V | V | V | V | SUCCESS-(ENABLED/ENABLED,ROM0) | SUCCESS-(ENABLED/ENABLED,ROM0) |
| V | V | V | X | SUCCESS-(ENABLED/ENABLED,ROM0) | SUCCESS-(ENABLED/ENABLED,ROM0) |
| V | V | X | V | FAIL-(DISABLED/DISABLED,SWITCH) | SUCCESS-(ENABLED/ENABLED,ROM1) |
| V | V | X | X | SUCCESS-(DISABLED/DISABLED,SWITCH) | SUCCESS-ISSUE A WARNING MESSAGE |
| V | X | V | V | SUCCESS-(ENABLED/ENABLED,ROM0) | SUCCESS-(ENABLED/ENABLED,ROM0) |
| V | X | V | X | SUCCESS-(ENABLED/ENABLED,ROM0) | SUCCESS-(ENABLED/ENABLED,ROM0) |
| V | X | X | V | FAIL-(DISABLED/DISABLED,SWITCH) | SUCCESS-(ENABLED/ENABLED,ROM1) |
| V | X | X | X | SUCCESS-(DISABLED/DISABLED,SWITCH) | SUCCESS-ISSUE A WARNING MESSAGE |
| X | V | V | V | SUCCESS-(DISABLED/ENABLED,ROM0) | SUCCESS-(DISABLED/ENABLED,ROM0) |
| X | V | V | X | SUCCESS-(DISABLED/ENABLED,ROM0) | SUCCESS-(DISABLED/ENABLED,ROM0) |
| X | V | X | V | FAIL-(DISABLED/DISABLED,SWITCH) | SUCCESS-(DISABLED/ENABLED,ROM1) |
| X | V | X | X | SUCCESS-(DISABLED/DISABLED,SWITCH) | SUCCESS-ISSUE A WARNING MESSAGE |
| X | X | V | V | SUCCESS-(DISABLED/DISABLED,SWITCH) | SUCCESS-ISSUE A WARNING MESSAGE |
| X | X | V | X | SUCCESS-(DISABLED/DISABLED,SWITCH) | SUCCESS-ISSUE A WARNING MESSAGE |
| X | X | X | V | SUCCESS-(DISABLED/DISABLED,SWITCH) | SUCCESS-ISSUE A WARNING MESSAGE |
| X | X | X | X | SUCCESS-(DISABLED/DISABLED,SWITCH) | SUCCESS-ISSUE A WARNING MESSAGE |

FIG. 7

ROM TIME-OUT<FRB TIME-OUT

| CPU0 | CPU1 | ROM0 | ROM1 | RESULTS FROM THE PRIOR ART (CPU0/CPU1,ROM) | RESULTS FROM THE PRESENT INVENTION |
|---|---|---|---|---|---|
| V | V | V | V | SUCCESS-(ENABLED/ENABLED,ROM0) | SUCCESS-(ENABLED/ENABLED,ROM0) |
| V | V | V | X | SUCCESS-(ENABLED/ENABLED,ROM0) | SUCCESS-(ENABLED/ENABLED,ROM0) |
| V | V | X | V | SUCCESS-(ENABLED/ENABLED,SWITCH) | SUCCESS-(ENABLED/ENABLED,ROM1) |
| V | V | X | X | SUCCESS-(ENABLED/ENABLED,SWITCH) | SUCCESS-ISSUE A WARNING MESSAGE |
| V | X | V | V | SUCCESS-(ENABLED/ENABLED,ROM0) | SUCCESS-(ENABLED/ENABLED,ROM0) |
| V | X | V | X | SUCCESS-(ENABLED/ENABLED,ROM0) | SUCCESS-(ENABLED/ENABLED,ROM0) |
| V | X | X | V | SUCCESS-(ENABLED/ENABLED,SWITCH) | SUCCESS-(ENABLED/ENABLED,ROM1) |
| V | X | X | X | SUCCESS-(ENABLED/ENABLED,SWITCH) | SUCCESS-ISSUE A WARNING MESSAGE |
| X | V | V | V | FAIL-(ENABLED/ENABLED,ROM0) | SUCCESS-(DISABLED/ENABLED,ROM0) |
| X | V | V | X | FAIL-(ENABLED/ENABLED,ROM0) | SUCCESS-(DISABLED/ENABLED,ROM0) |
| X | V | X | V | FAIL-(ENABLED/ENABLED,SWITCH) | SUCCESS-(DISABLED/ENABLED,ROM1) |
| X | V | X | X | SUCCESS-(ENABLED/ENABLED,SWITCH) | SUCCESS-ISSUE A WARNING MESSAGE |
| X | X | V | V | SUCCESS-(ENABLED/ENABLED,SWITCH) | SUCCESS-ISSUE A WARNING MESSAGE |
| X | X | V | X | SUCCESS-(ENABLED/ENABLED,SWITCH) | SUCCESS-ISSUE A WARNING MESSAGE |
| X | X | X | V | SUCCESS-(ENABLED/ENABLED,SWITCH) | SUCCESS-ISSUE A WARNING MESSAGE |
| X | X | X | X | SUCCESS-(ENABLED/ENABLED,SWITCH) | SUCCESS-ISSUE A WARNING MESSAGE |

FIG. 8

BOOT-SWITCHING APPARATUS AND METHOD FOR MULTIPROCESSOR AND MULTI-MEMORY SYSTEM

BACKGROUND OF THE INVENTION

1. Field of the Invention

The present invention generally relates to a booting apparatus and a method thereof, in particular, to a booting apparatus which uses a single timer for switching between a plurality of processors and a plurality of memories and a method thereof.

2. Description of Related Art

In recent years, processor speed has been increased dramatically along with the development of information technology. Both Intel and AMD, the two major processor manufacturers, have been focusing in the development of higher-frequency processor in order to gain the leadership in the processor market. Today, the clock cycle of processor has been increased from 100 MHz to 1 GHz. However, along with the increase in the clock cycle of processor, the hardware complexity thereof is also increased, and processor manufacturers have also realized that the speed of processor cannot be increased infinitely, therefore another method has to be adopted to increase the speed of data processing.

Accordingly, a multiprocessor structure has been developed as a new processor technology, wherein a plurality of processors are connected together to achieve the purpose of multi-processing. While booting such a multi-processor system, one of the processors is selected as a bootstrap processor for executing a system booting procedure, and the other processors are considered as application processors and are used for assisting the bootstrap processor. When the system is powered on, each of the processors executes a built-in self-testing function, and if any processor encounters a boot-up error, this processor issues a status flag to notify the system about the error, so that the system can carry out subsequent process. However, if it is the bootstrap processor who encounters an error, an application processor has to be used for replacing the bootstrap processor to carry out the system booting procedure properly.

Conventionally, in the situation mentioned above, a fault resilient booting (FRB) technique is adopted to carry out a resilient booting operation by using a basic input/output system (BIOS), a baseboard management controller (BMC), or other hardware. The conventional FRB technique will be described herein with a system having two processors as example. FIG. 1 is a structural diagram of a conventional dual-processor system which uses a BMC for carrying out FRB, and FIG. 2 is a flowchart illustrating the procedure of the conventional dual-processor system carrying out FRB by using the BMC. First referring to FIG. 1, in the dual-processor system 100, the processor 110 and the processor 120 are respectively connected to the enabling pin 131 and the enabling pin 132 of the BMC 130, wherein the processor 110 is the bootstrap processor. Besides, the BMC 130 is built in with a FRB timer 133 and is connected to a general purpose input/output (GPIO) pin 140 of the BIOS system.

Referring to both FIG. 1 and FIG. 2, a processor for executing the FRB function is preset in the BMC 130 (step S210) before the dual-processor system 100 is powered on. The presetting procedure includes setting a time-out and setting the enabling pins 131 and 132 of the BMC 130 to 1 so that the processor 110 and the processor 120 can be both enabled after the system is powered on. Whenever the system 100 is powered on or reset (step S220), the FRB timer 133 of the BMC 130 is started for counting down the time-out (step S230), and meanwhile, it is determined whether a disabling signal is received (step S240). If the BIOS completes a power on self test (POST) successfully, a disabling signal is issued through the GPIO pin 140 to notify the BMC 130 to disable the FRB timer 133, and from here on the processors 110 and 120 of the system 100 can continue with a normal booting procedure (step S250). However, if the bootstrap processor 110 encounters an error during the system booting procedure, which means the system 100 cannot be booted properly, the FRB timer 133 is not disabled by the BIOS system. Thus, when it is determined that the countdown of the time-out by the FRB timer 133 has been finished (step S260), the BMC 130 switches off the processor 110 by setting the enabling pin 131 to 0 (step S270) and then resets the system 100 to boot up the system again with the processor 120 as the bootstrap processor (step S280).

The theory described above is also applicable to a dual BIOS read only memory (ROM) technique, wherein the dual BIOS ROM technique refers to a technique of disposing two BIOS ROMs on a motherboard for storing the data of the BIOS. A system using dual BIOS ROMs can avoid failure in system boot-up caused by failure in BIOS upgrading wherein there is dismatch between the BIOS file and the motherboard, altered BIOS file, or power failure during BIOS upgrading.

FIG. 3 is a structural diagram of a conventional dual BIOS ROM system, and FIG. 4 is a flowchart illustrating the operation of the conventional dual BIOS ROM system. First referring to FIG. 3, the BIOS ROM system 300 includes a super I/O (SIO) chip 310. The SIO chip 310 is connected to ROMs 320 and 330 via an address/data line and is respectively connected to the ROMs 320 and 330 via a selection pin 311, wherein it is assumed that the ROM 320 is for booting the system while the ROM 330 is used as a standby. Here the signal sent by the selection pin 311 is 1 so that the ROM 320 is enabled, and the signal is then inversed by an inverter 340 and sent to the ROM 330 to disable it. In addition, a ROM timer 312 is disposed in the SIO chip 310 for selecting either the ROM 320 or the ROM 330 for reading the BIOS.

Referring to both FIG. 3 and FIG. 4, after the system 300 is powered on or reset (step S410), the ROM timer 312 starts to count down the time-out (step S420), and meanwhile, it is determined whether a timer disabling signal is received (step S430). If the BIOS can execute a POST normally, then similarly, a disabling signal is issued through a GPIO pin 350 to notify the SIO CHIP 310 to disable the ROM timer 312. Here the signal output by the selection pin 311 is not affected and the ROM 320 is still used for booting the system (step S440). However, if an error occurs to the ROM 320 during the system booting procedure, the BIOS cannot boot the system normally and accordingly cannot disable the ROM timer 312. When it is determined that the countdown of the time-out has been completed (step S450), the ROMs are switched (step S460), and the signal sent by the selection pin 311 is set to 0, so that the ROM 320 is disabled and the ROM 330 is enabled. Finally, the system is reset and the ROM 330 is used for booting the system (step S470).

As described above, the multiple processor system and the dual BIOS ROM system respectively use a timer for processor switching or BIOS ROM switching. If the two set different time-outs and an error occurs during the system booting procedure, the system may be reset once the countdown of the time-out at either party (for example, the processors) is completed but before finding out which party has caused the error (for example, the BIOS ROMs), thus, system misjudgement may be caused. For example, assuming that the time-out of the processors is shorter than that of the BIOS ROMs, if the processors both work properly during the system booting procedure but the preset BIOS ROM encounters an error, the system misjudges that the processor has caused the error and then resets the system since the timer of the processor completes the countdown first. In this case, the system will never be able to switch processors or BIOS ROMs and accordingly cannot be booted up successfully.

SUMMARY OF THE INVENTION

Accordingly, the present invention is directed to a boot-switching apparatus for a multiprocessor and multi-memory system, wherein the booting statuses of the processors are detected through detection pins connected to the processors, and a single timer is used for determining the erroneous processor or memory, and normal processor and memory are selected for booting the system.

The present invention is directed to a multiprocessor and multi-memory system, wherein the reason of why the system cannot be booted up is detected by a boot-switching apparatus, and the erroneous processor or memory is replaced so that a proper system booting operation can be carried out.

The present invention is directed to a boot-switching method for a multiprocessor and multi-memory system, wherein a time-out is counted down when the system is just powered on, and whether an error has occurred to the processor is first determined and then whether an error has occurred to the memory is determined when the countdown is completed in order to find out and resolve the problem of system booting failure.

The present invention provides a boot-switching apparatus for a multiprocessor and multi-memory system. The boot-switching apparatus is disposed in a system having a plurality of processors and a plurality of memories. The boot-switching apparatus includes a plurality of processor enabling pins, a plurality of processor detection pins, a plurality of memory selection pins, and a timer. The processor enabling pins are respectively coupled to the processors, and an enabling signal is set on each of the processor enabling pins to enable or disable the corresponding processor. The processor detection pins are also respectively coupled to the processors for respectively detecting the working status of the corresponding processor and obtaining a detection signal. The memory selection pins are coupled to the memories and are suitable for setting a selection signal in order to switch the memories. The timer is preset with a time-out. When the system is powered on, the timer starts to count down from the time-out. When the time-out is up, it is determined that whether the enabling signal on each processor enabling pin matches the detection signal on each processor detection pin, wherein if the enabling signal does not match the detection signal, the corresponding processor is disabled through the corresponding processor enabling pin, while if all the enabling signals and detection signals match each other, the memories are switched through the memory selection pins.

According to an embodiment of the present invention, the boot-switching apparatus for a multiprocessor and multi-memory system further includes a warning apparatus which issues a warning message when all the memories have been switched but the system still cannot be booted up properly.

According to an embodiment of the present invention, the memories are read only memories (ROMs) for storing a basic input/output system (BIOS). The boot-switching apparatus may be disposed in a baseboard management controller (BMC). In addition, the timer may be a fault resilient booting (FRB) timer.

According to an embodiment of the present invention, the enabling signals of the processor enabling pins are preset to an enabling status. On the other hand, the selection signals of the memory selection pins preset one of the memories to enabled status and the other memories to disabled status. When the memories are to be switched, the selection signals of the memory selection pins set another memory to enabled status and the other memories to disabled status.

The present invention provides a multiprocessor and multi-memory system including a plurality of processors, a plurality of memories, and a boot-switching apparatus. The boot-switching apparatus includes a plurality of processor enabling pins, a plurality of processor detection pins, a plurality of memory selection pins, and a timer. The processor enabling pins are respectively coupled to the processors, and an enabling signal is set to each of the processor enabling pins for enabling or disabling the corresponding processor. The processor detection pins are also respectively coupled to the processors for respectively detecting the working status of the corresponding processor and obtaining a detection signal. The memory selection pins are coupled to the memories and are suitable for setting a selection signal to switch the memories. The timer is set with a timer-out. When the system is powered on, the timer starts counting down from the time-out, and when the countdown is completed, it is determined that whether the enabling signal on each processor enabling pin matches the detection signal on each processor detection pin. If the enabling signal does not match the detection signal, the corresponding processor is disabled through the corresponding processor enabling pin, while if all the enabling signals and the detection signals match each other, the memories are switched through the memory selection pins.

According to an embodiment of the present invention, a multiplexer is further disposed between the memory selection pins and the memories for transmitting selection signals to the corresponding memories.

According to an embodiment of the present invention, a detection module is further disposed between the processor detection pins and the processors, and the detection module is suitable for detecting the working statuses of the processors and sending the corresponding detection signals to the corresponding processor detection pins.

The present invention provides a boot-switching method for a multiprocessor and a multi-memory system. The boot-switching method is suitable for a system having a plurality of processors and a plurality of memories. The boot-switching method includes following steps. First, when the system is powered on, it is started to count down a time-out, and at the same time it is determined that whether a timer disabling signal is received. If the timer disabling signal is not received and the countdown is completed, whether the processors can work properly is further detected and a plurality of corresponding detection signals is obtained. Next, it is determined that whether each of the detection signals matches the corresponding enabling signal. If the detection signal does not match the corresponding enabling signal, the enabling signal is set to disabling status in order to disable the corresponding processor; otherwise if all the detection signals and enabling signals match each other, the selection signal sent to the memories is adjusted to switch the memory used for booting the system.

According to an embodiment of the present invention, the boot-switching method further includes booting the system using the current processor and memory if it is determined that the timer disabling signal is received.

According to an embodiment of the present invention, the countdown of the time-out is cancelled through the BIOS when the BIOS executes system booting normally.

According to an embodiment of the present invention, the boot-switching method further includes resetting the system and booting the system with the switched processor and memory after the original processor is disabled and the memories are switched.

According to an embodiment of the present invention, the boot-switching method further includes setting all the enabling signals to enabling status, selecting a memory as the bootstrap memory, and setting the corresponding selection signal to enabling status and the selection signals of the other memories to disabling status before booting the system.

According to an embodiment of the present invention, the step of switching memories includes setting the selection signal of the originally selected memory to disabling status, selecting a memory from the remaining memories as the bootstrap memory, and setting the corresponding selection signal of the memory to enabling status.

According to an embodiment of the present invention, a warning message is issued when all the memories have been switched and the system still cannot be booted up properly.

In the present invention, a single timer is used for determining whether any error occurs to the processor or memory of the system when the system is booting. Whether the processors work properly is first detected through the corresponding detection pins and then whether to switch the memories is determined in order to find out the reason of the error. Another processor or memory is then selected for booting the system again. Accordingly, the problem in the prior art that the source of the error cannot be determined can be resolved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 7 is a table showing the comparison between the present invention and the prior art.

FIG. 8 is a table showing the comparison between the present invention and the prior art.

DESCRIPTION OF THE EMBODIMENTS

Figure 1:
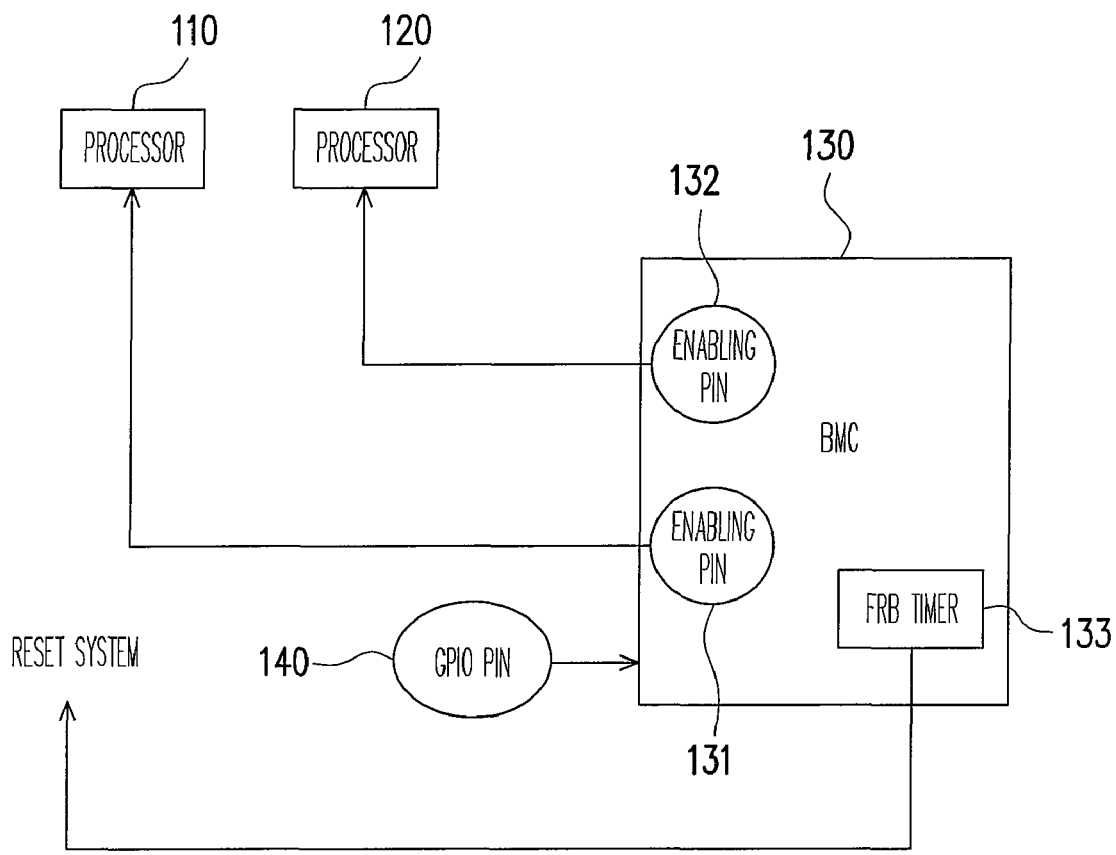
FIG. 1 is a structural diagram of a conventional dual-processor system which uses a BMC for FRB.
Figure 2:
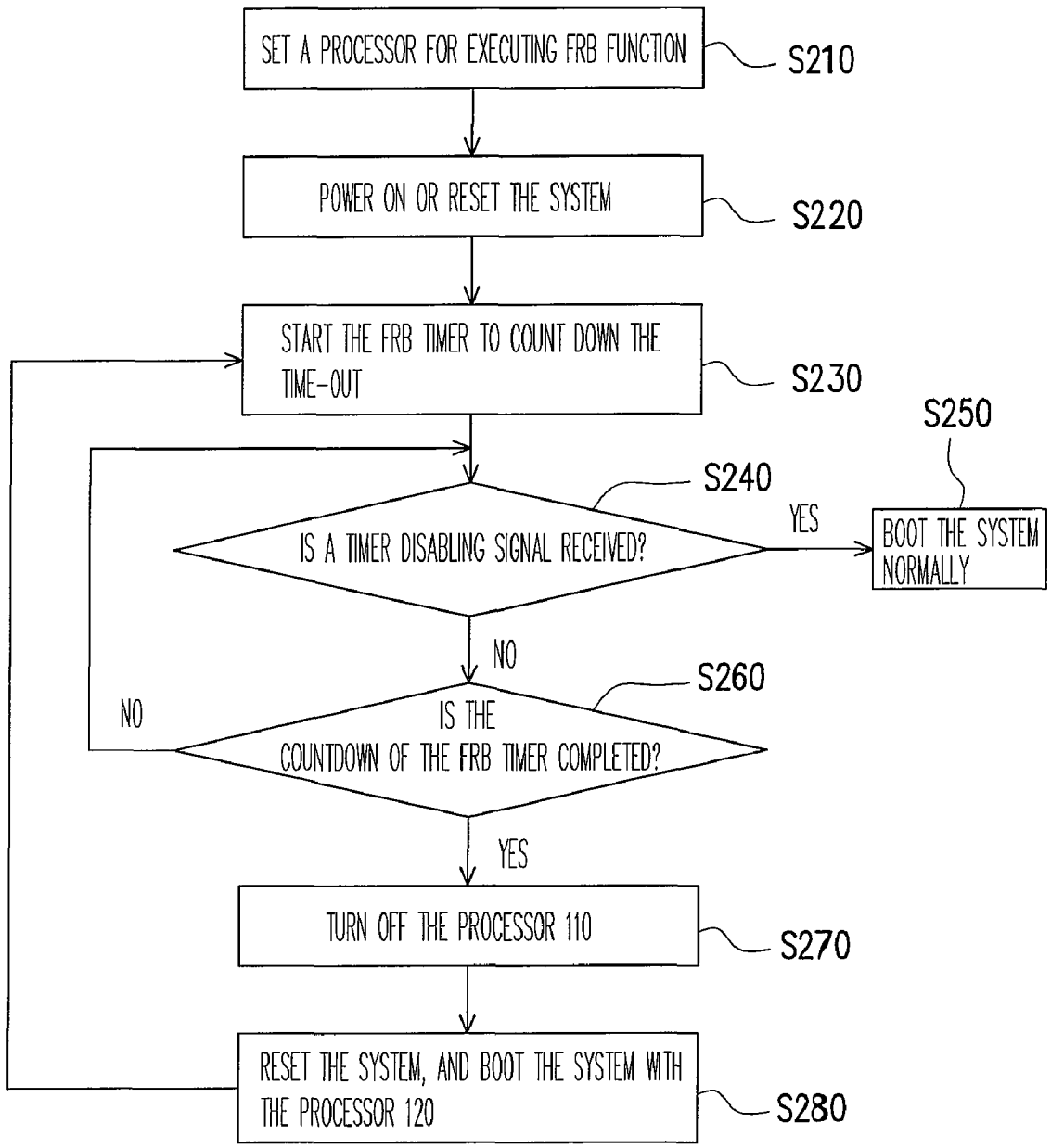
FIG. 2 is a flowchart illustrating the procedure of the conventional dual-processor system carrying out FRB with the BMC.
Figure 3:
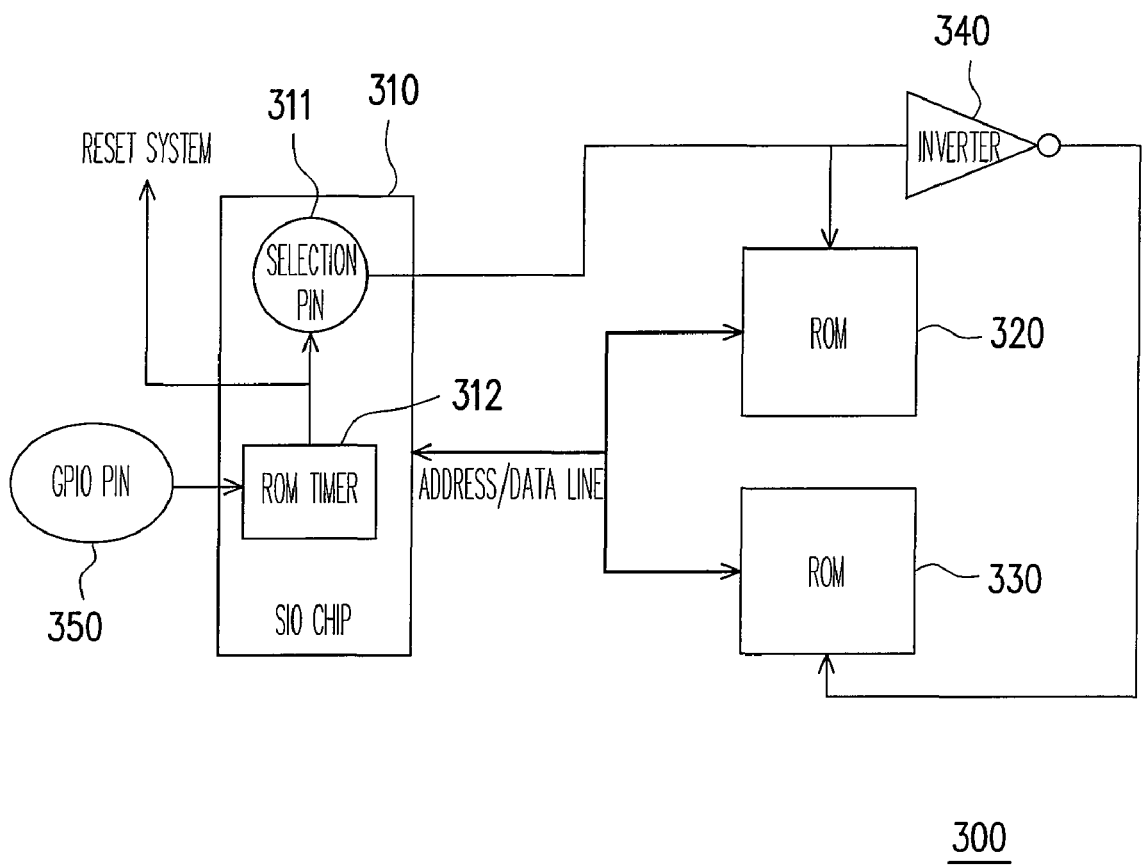
FIG. 3 is a structural diagram of a conventional dual BIOS ROM system.
Figure 4:
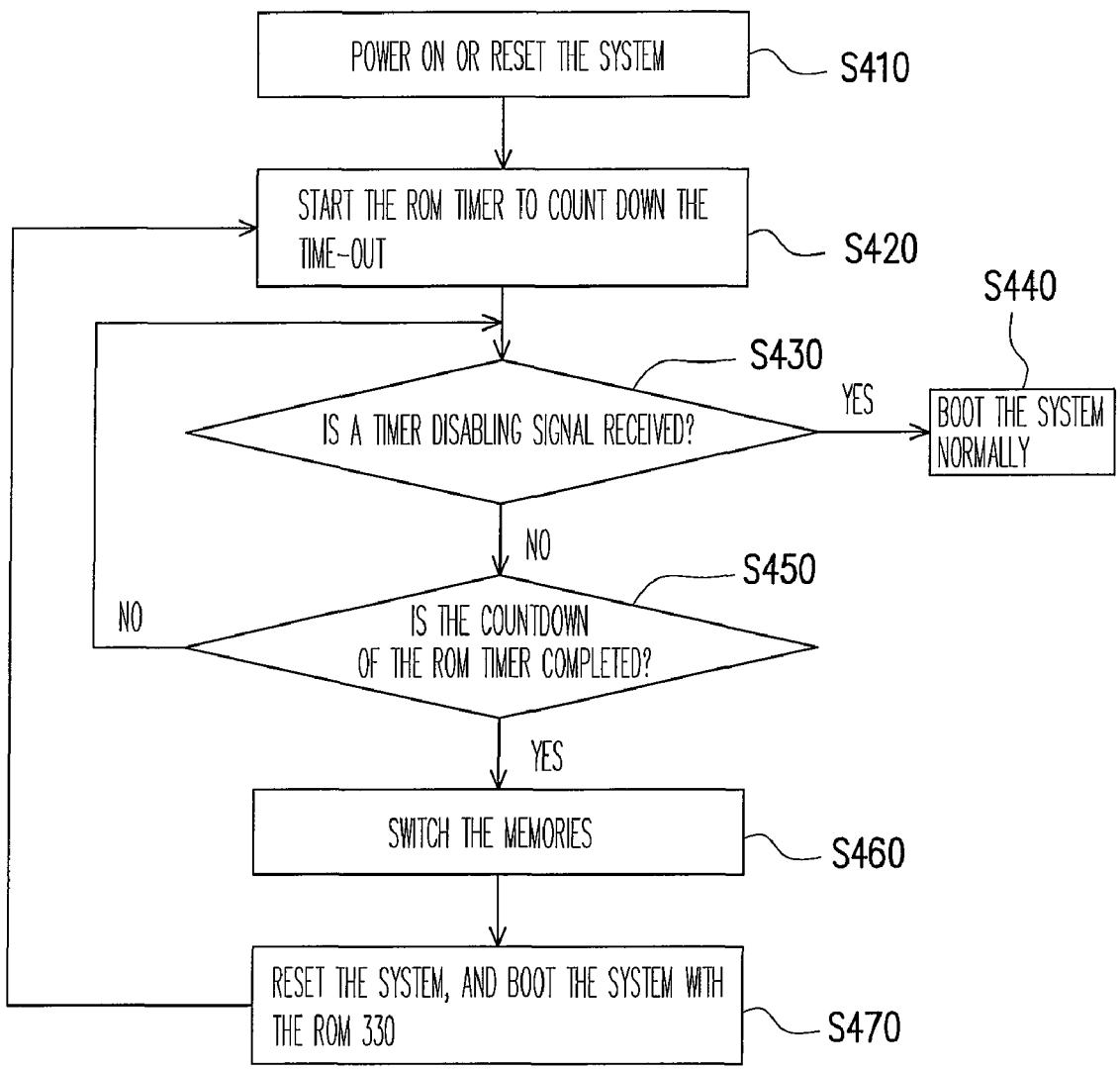
FIG. 4 is a flowchart illustrating the operation of the conventional dual BIOS ROM system.

Reference will now be made in detail to the present preferred embodiments of the invention, examples of which are illustrated in the accompanying drawings. Wherever possible, the same reference numbers are used in the drawings and the description to refer to the same or like parts.

To avoid the misjudgment in the prior art caused by different time-outs of FRB timer and ROM timer, the two timers are combined and when a booting error occurs, it is respectively detected whether the error is from the processor or the memory, so that the reason of the error can be located precisely and the system can select appropriate processor or memory for executing the booting procedure. The present invention provides a boot-switching apparatus for a multiprocessor and multi-memory system and a method thereof based on foregoing concept. The advantages of the present invention will be described and become more apparent from the following detailed description of exemplary embodiments with reference to accompanying drawings.

Figure 5:
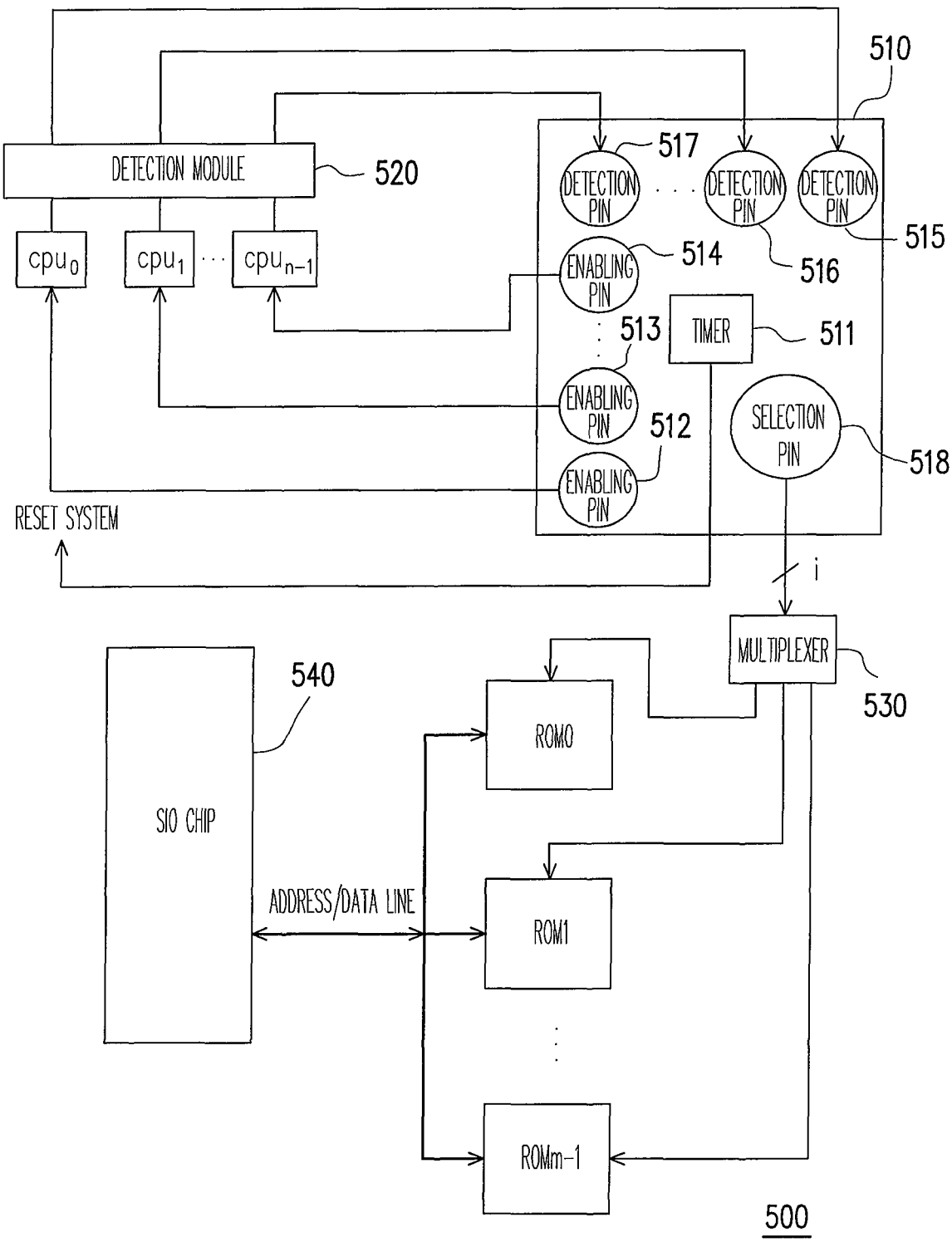
FIG. 5 is a block diagram of a multiprocessor and multi-memory system according to an embodiment of the present invention.

FIG. 5 is a block diagram of a multiprocessor and multi-memory system according to an embodiment of the present invention. Referring to FIG. 5, the multiprocessor and multi-memory system 500 includes a baseboard management controller (BMC) 510, a detection module 520, a multiplexer 530, a super I/O (SIO) chip 540, n processors CPU0, CPU1, . . . CPUn−1, and m read only memories (ROMs) ROM0, ROM1, . . . , and ROMm−1. The ROMs ROM0, ROM1, . . . , and ROMm−1 may be ROMs used for storing the data of a basic input/output system (BIOS).

The BMC 510 includes enabling pins 512~514, detection pins 515~517, a selection pin 518, and a timer 511. The enabling pins 512, 513, and 514 are respectively coupled to the processors CPU0, CPU1, and CPUn−1, and are suitable for setting enabling signals in the BMC 510 to respectively enable or disable the processors CPU0, CPU1, . . . , and CPUn−1. The enabling signals of the enabling pins are usually preset to enabling status first, which means, the processors CPU0, CPU1, . . . , CPUn−1 are presumed working properly; therefore the processors CPU0, CPU1, . . . , CPUn−1 are enabled when the system is powered on.

The detection pins 515, 516, and 517 are respectively connected to the processors CPU0, CPU1, and CPUn−1 through the detection module 520 and are used for detecting the working statues of the processors CPU0, CPU1, and CPUn−1 and obtaining corresponding detection signals. The detection module 520 is used for detecting the working statuses of the processors CPU0, CPU1, . . . , CPUn−1 and transmitting the detection signals to the corresponding detection pins 515~517.

Besides, the selection pin 518 is respectively coupled to the ROMs ROM0, ROM1, . . . , and ROMm−1 through the multiplexer 530 and is suitable for setting a selection signal in the BMC 510 to switch the ROMs ROM0, ROM1, . . . , and ROMm−1. Since the system 500 can carry out its booting procedure by reading the BIOS data from only one of the ROMs, the selection signals sent to the ROMs ROM0, ROM1, . . . , and ROMm−1 only preset one of the ROMs to enabled status while the other ROMs to disabled status. However, the preset ROM has to be switched to another ROM if an error occurs to the preset ROM while the system is being booted. Here the current ROM is disabled and another ROM is selected and set to enabled status. In addition, the other ROMs remain the original disabled status. As described above, the memory switching function in the present invention can be achieved.

Moreover, the BMC 510 also includes a timer 511 which may be a fault resilient booting (FRB) timer. The power supply of the BMC 510 is independent; thus, a user can turn on the power supply of the BMC 510 to set the time-out of the timer 511 before powering on the system 500, and the timer 511 starts to count down the time-out when the system 500 is powered on.

The SIO chip 540 is respectively connected to the ROMs ROM0, ROM1, . . . , and ROMm−1 through an address/data line, and when the system 500 is booted up, the SIO chip 540 reads the BIOS data from the enabled ROM according to the statuses of the ROMs ROM0, ROM, ..., and ROMm−1.

It should be mentioned here that the multiprocessor and multi-memory system 500 in the present embodiment further includes a warning apparatus (not shown). The warning apparatus issues a warning message to notify the user that the ROMs ROM0, ROM1, ..., and ROMm−1 need to be replaced when all the ROMs ROM0, ROM1, ..., and ROMm−1 have been switched but the system 500 still cannot be booted up properly.

Figure 6:
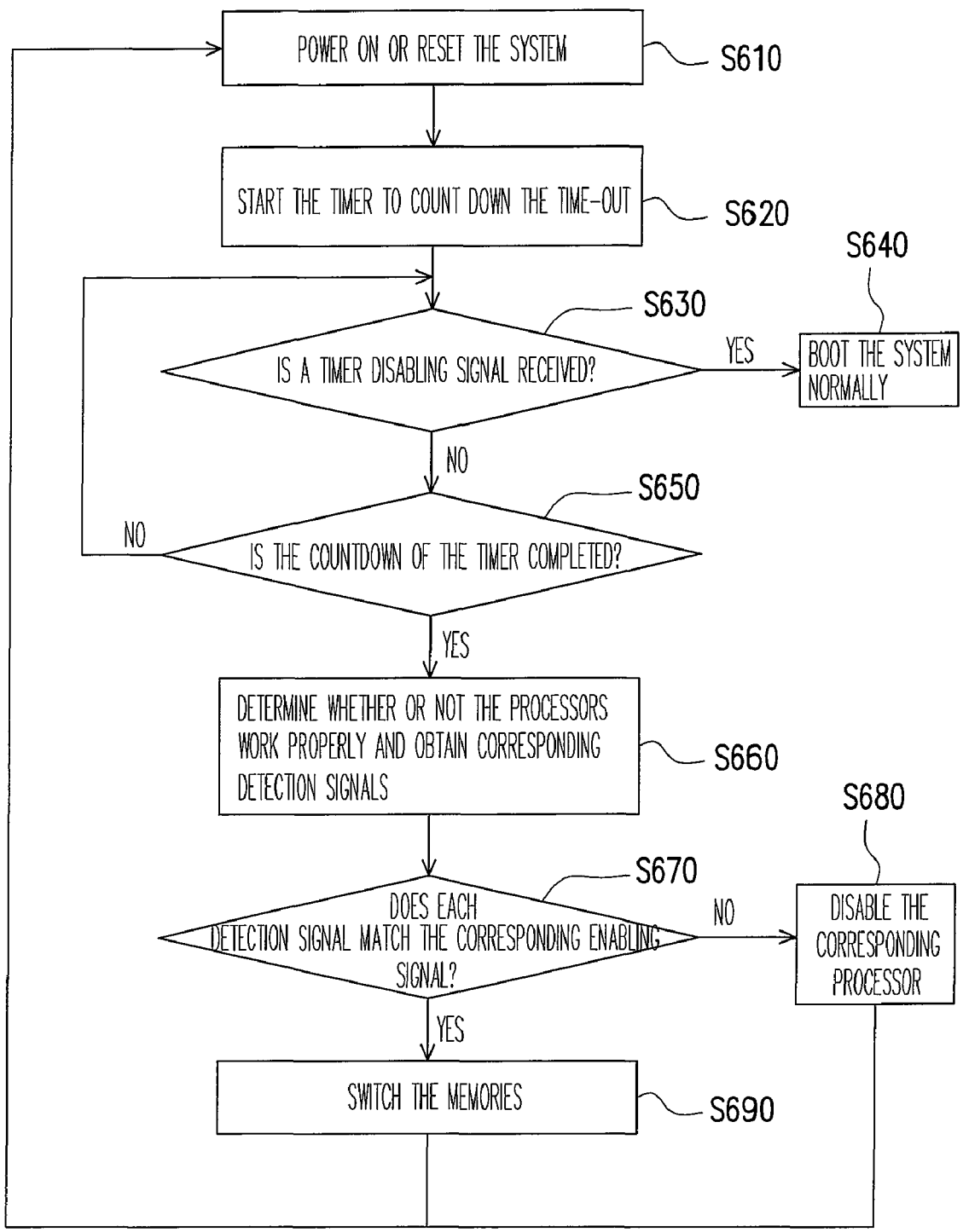
FIG. 6 is a flowchart illustrating a boot-switching method for a multiprocessor and multi-memory system according to an embodiment of the present invention.

The present invention further provides a boot-switching method based on the structure of the multiprocessor and multi-memory system 500 described above. Another embodiment of the present invention will be described herein to explain the detailed procedure of signal and data transmission between various components of the multiprocessor and multi-memory system. FIG. 6 is a flowchart illustrating a boot-switching method for a multiprocessor and multi-memory system according to an embodiment of the present invention. Referring to FIG. 6, in the present embodiment, it is pre-assumed that all the processors can work properly, thus, the enabling signals on all the enabling pins are set to enabling status. In addition, a ROM is selected in advance as the bootstrap memory, and the corresponding selection signal is set to enabling status while the selection signals of the other ROMs are set to disabling status. The following steps are executed after all the foregoing settings are completed.

First, a user powers on the system 500 or the system 500 resets itself (step S610), at the same time, the timer 511 starts to count down a time-out (step S620).

During the countdown, the BMC 510 detects whether or not a timer disabling signal sent by a general purpose input/output (GPIO) pin (not shown) of the BIOS is received in order to decide whether to cancel the countdown of the time-out (step S630). If the timer disabling signal is received, which means the system 500 can be booted up properly, the timer 511 is disabled, the countdown of the time-out is stopped, and the current processor and ROM are used for booting the system (step S640).

Contrarily, if the timer disabling signal is not received, then the countdown is continued and whether the countdown of the time-out is completed is determined (step S650). When the countdown of the time-out is completed, whether the processors can operate normally is detected to obtain corresponding detection signals (step S660). It is further determined that whether or not the detection signal received by each detection pin (for example, the detection pin 515) matches the enabling signal of the corresponding enabling pin (for example, the enabling pin 512) (step S670).

If it is determined that the detection signal does not match the corresponding enabling signal, the enabling signal on the enabling pin is set to disabling status by the BMC 510 in order to disable the corresponding processor (step S680). Contrarily, if it is determined that the detection signal matches the corresponding enabling signal, which means the processor works as expected, no action is taken to the processor.

It should be noted that if all the detection signals and enabling signals are determined to match each other, it can be determined that all the processors work as expected, then it can be deduced accordingly that it is the ROM which causes the booting problem. Here the selection signals sent to the ROMs are adjusted in order to switch to another ROM (step S690). To be specific, the selection signal of the originally selected memory is set to disabling status, while another memory is selected among the remaining memories to serve as the bootstrap memory, and the corresponding selection signal is set to enabling status.

After the processor is disabled as in step S680 or the memories are switched as in step S690, the procedure returns to step S610 to reset the system, and the newly selected processor and memory are used for booting the system. This process is repeated until eventually a processor and a memory which can work normally are selected for booting the system. If eventually it is found that all the processors or all the memories cannot work properly, which means all the switching has failed, a warning message is issued to notify the user to replace the damaged processors or memories.

To describe foregoing operation in more details, another embodiment of the present invention will be described herein. In the present embodiment, it is assumed that the original enabling signal set to the enabling pin 512 is 1, and if the detection module 520 determines that the processor CPU0 works normally, the detection signal it sends is also 1. Thus, it is determined by comparing the two signals that the working status of the processor CPU0 is as expected and accordingly it is not necessary to disable the processor CPU0. However, if the detection module 520 determines that the processor CPU0 does not work properly, it sends a detection signal 0, which means that the processor CPU0 has caused the failure in system boot-up. Accordingly, the enabling signal is changed to 0 in order to disable the processor CPU0. In addition, if it is found that all the processors CPU0, CPU1, ..., CPUn−1 work properly based on foregoing theory, it is determined that the error causing the system booting failure is from the memory, and then an operation to switch the memories can be carried out. If the original bootstrap memory is ROM0, ROM1 can be used stead for booting the system. As described above, the reason of a system booting failure can be found out through the boot-switching method provided by the present invention, and a remedial action can be carried out correspondingly to boot the system properly.

FIG. 7 and FIG. 8 are tables showing the comparisons between the present invention and the prior art, wherein the comparison tables show results of a system having dual processors (CPU0 and CPU1) and dual ROMs (ROM0 and ROM1) respectively carrying out the present invention and the prior art. In the prior art portion in FIG. 7, it is assumed that the ROM time-out is longer than the FRB time-out, while in the prior art portion in FIG. 8, it is assumed that the ROM time-out is shorter than the FRB time-out. In addition, in the figures, tick signs represent normal operations and cross signs represent abnormal or failed operations. It can be observed from the figures that the prior art causes many failures and the system may not be booted up ever; on the contrary, by using the apparatus and method in the present invention, the reason of the error can always be found, and when both the processors or memories are abnormal, a warning message is issued to the user. Thus, the present invention is more reliable than the prior art.

In summary, the boot-switching apparatus for a multiprocessor and multi-memory system in the present invention has at least following advantages:

1. a single timer is used for determining whether a booting error has occurred to the system, so that the misjudgement caused by using two different timers can be avoided, and the system can be led to select a normal processor or memory for executing the system boot-up.

2. detection pins and enabling pins are respectively connected to the processors so that when a booting error occurs, the erroneous processor can be located and disabled instantly, and another processor is then selected for booting the system properly.

3. it can be determined that the booting error is caused by the memory when all the processors are determined to be working properly, and then another memory is selected as the bootstrap memory so that the system can obtain the correct booting data when it is reset.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A boot-switching apparatus, disposed in a system having a plurality of processors and a plurality of memories, comprising:
   a plurality of processor enabling pins, respectively coupled to the processors, each of the processor enabling pins being suitable for setting an enabling signal to enable or disable one of the processors, which corresponds to the processor enabling pin;
   a plurality of processor detection pins, respectively coupled to the processors, each of the processor detection pins being suitable for detecting working status of one of the processors, which corresponds to the processor detection pin, and obtaining a detection signal;
   a plurality of memory selection pins, coupled to the memories, suitable for setting a selection signal to switch the memories; and
   a timer, set with a time-out, suitable for counting down the time-out when the system is booting, wherein
   when the countdown of the time-out is completed, whether or not each of the enabling signals of the processor enabling pins matches the detection signal of one of the processor detection pins is determined, wherein the processor enabling pin and the processor detection pin correspond to the same processor,
   the processor is disabled through one of the processor enabling pins, which corresponds to the processor, if the enabling signal does not match the detection signal,
   the memories are switched through the memory selection pins one by one until a memory that works normally is located if all the enabling signals and detection signals match each other.

2. The boot-switching apparatus according to claim 1 further comprising:
   a warning apparatus, suitable for issuing a warning message when all the memories have been switched but the system still cannot be booted up properly.

3. The boot-switching apparatus according to claim 1, wherein the memories are read only memories (ROMs) for storing a basic input/output system (BIOS).

4. The boot-switching apparatus according to claim 1, wherein the boot-switching apparatus is disposed in a baseboard management controller (BMC).

5. The boot-switching apparatus according to claim 1, wherein the timer comprises a fault resilient booting (FRB) timer.

6. The boot-switching apparatus according to claim 1, wherein the enabling signals of the processor enabling pins are preset to enabling status.

7. The boot-switching apparatus according to claim 1, wherein the selection signals of the memory selection pins preset one of the memories to enabled status and the other memories to disabled status.

8. The boot-switching apparatus according to claim 7, wherein to switch the memories, another one of the memories is set to enabled status and the other memories are set to disabled status.

9. A multiprocessor and multi-memory system, comprising:
   a plurality of processors;
   a plurality of memories; and
   a boot-switching apparatus, comprising:
   a plurality of processor enabling pins, respectively coupled to the processors, each of the processor enabling pins being suitable for setting an enabling signal to enable or disable the corresponding processor;
   a plurality of processor detection pins, respectively coupled to the processors, each of the processor detection pins being suitable for detecting the working status of the corresponding processor and obtaining a detection signal;
   a plurality of memory selection pins, coupled to the memories, suitable or setting a selection signal to switch the memories; and
   a timer, set with a time-out, suitable for counting down the time-out when the system is booting, wherein
   when the countdown of the time-out is completed, whether or not each of the enabling signals of the processor enabling pins matches the corresponding detection signal of the processor detection pins is determined,
   the processor is disabled through the corresponding processor enabling pin if the enabling signal does not match the detection signal,
   the memories are switched through the memory selection pins one by one until a memory that works normally is located if all the enabling signals and detection signals match each other.

10. The multiprocessor and multi-memory system according to claim 9 further comprising:
    a warning apparatus, suitable for issuing a warning message when all the memories have been switched but the system still cannot be booted up properly.

11. The multiprocessor and multi-memory system according to claim 9 further comprising:
    a multiplexer, disposed between the memory selection pins and the memories, the multiplexer being suitable for transmitting the selection signals to the corresponding memories.

12. The multiprocessor and multi-memory system according to claim 9 further comprising:
    a detection module, disposed between the processor detection pins and the processors, suitable for detecting the working statuses of the processors and transmitting the detection signals to the corresponding processor detection pins.

13. The multiprocessor and multi-memory system according to claim 9 further comprising:
    a super I/O (SIO) chip, connected to the memories via an address/data line, the SIO chip receiving the booting data of a BIOS from one of the memories according to the statuses of the memories.

14. The multiprocessor and multi-memory system according to claim 9, wherein the memories are ROMs storing the BIOS.

15. The multiprocessor and multi-memory system according to claim 9, wherein the boot-switching apparatus is disposed in a BMC.

16. The multiprocessor and multi-memory system according to claim 9, wherein the timer comprises a FRB timer.

17. The multiprocessor and multi-memory system according to claim 9, wherein the enabling signals of the processor enabling pins are preset to enabling status.

18. The multiprocessor and multi-memory system according to claim 9, wherein the selection signals of the memory selection pins preset one of the memories to enabled status and the other memories to disabled status.

19. The multiprocessor and multi-memory system according to claim 18, wherein to switch the memories, another one of the memories is set to enabled status and the other memories are set to disabled status.

20. A boot-switching method for a multiprocessor and multi-memory system, suitable for a system having a plurality of processors and a plurality of memories, comprising:
    starting to count down a time-out when the system is booted;
    determining whether or not a timer disabling signal is received;
    detecting whether or not the processors work properly and obtaining a plurality of detection signals if the timer disabling signal is not received and the countdown of the time-out has completed;
    determining whether or not each of the detection signals matches one of a plurality of enabling signals, wherein the detection signal and the enabling signal correspond to the same processor;
    setting the enabling signal to disabling status in order to disable the processor which corresponds to the enabling signal if the detection signal does not match the enabling signal; and
    adjusting the selection signals sent to the memories to switch the memories one by one until a memory that works normally is located if all the detection signals and enabling signals match each other.

21. The boot-switching method according to claim 20, wherein after the step of determining whether or not the timer disabling signal is received, the boot-switching method further comprises:
    executing system booting with current processors and memory if the timer disabling signal is received.

22. The boot-switching method according to claim 20, wherein the countdown of the time-out is cancelled through a BIOS when the BIOS executes system booting normally.

23. The boot-switching method according to claim 20, wherein after disabling the corresponding processor and switching the memories, the boot-switching method further comprises:
    resetting the system, and executing system booting with the switched processor and memory.

24. The boot-switching method according to claim 20, wherein before booting the system, the boot-switching method further comprises:
    setting all the enabling signals to enabling status.

25. The boot-switching method according to claim 20, wherein before booting the system, the boot-switching method further comprises:
    selecting one of the memories as a bootstrap memory, setting the corresponding selection signal to enabling status and the selection signals of the other memories to disabling status.

26. The boot-switching method according to claim 25, wherein the step of switching the memories comprises:
    setting the selection signal of the originally selected memory to disabling status; and
    selecting one of the other memories as the bootstrap memory and setting the corresponding selection signal to enabling status.

27. The boot-switching method according to claim 26, wherein a warning message is issued when all the memories have been switched and the system still cannot be booted up properly.

* * * * *